(12) United States Patent
Wang et al.

(10) Patent No.: US 11,133,533 B2
(45) Date of Patent: Sep. 28, 2021

(54) DIFFERENTIAL VOLTAGE MEASUREMENT DEVICE

(71) Applicant: Yazaki Corporation, Tokyo (JP)

(72) Inventors: Jian Wang, Susono (JP); Hironao Fujii, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 161 days.

(21) Appl. No.: 15/824,243

(22) Filed: Nov. 28, 2017

(65) Prior Publication Data

US 2018/0212279 A1 Jul. 26, 2018

(30) Foreign Application Priority Data

Jan. 20, 2017 (JP) .............................. JP2017-008369

(51) Int. Cl.
*H01M 10/42* (2006.01)
*H01M 10/02* (2006.01)
*H01M 10/48* (2006.01)

(52) U.S. Cl.
CPC ......... *H01M 10/425* (2013.01); *H01M 10/02* (2013.01); *H01M 10/482* (2013.01); *H01M 2010/4271* (2013.01)

(58) Field of Classification Search
CPC .. H01M 10/425; H01M 10/02; H01M 10/482; H01M 2010/4271
See application file for complete search history.

(56) References Cited

U.S. PATENT DOCUMENTS

| 6,362,627 B1* | 3/2002 | Shimamoto ............ G01R 19/25 324/434 |
| 2003/0226082 A1* | 12/2003 | Kim ..................... G06K 19/073 714/734 |
| 2006/0035115 A1* | 2/2006 | Norimatsu ........ H01M 8/04223 429/9 |
| 2016/0056643 A1 | 2/2016 | Syouda |
| 2017/0187201 A1 | 6/2017 | Wang et al. |

FOREIGN PATENT DOCUMENTS

| JP | 2014-219311 A | 11/2014 |
| JP | 2016-223051 A | 12/2016 |

OTHER PUBLICATIONS

English Machine Translation of Shoda, JP 2014219311A Nov. 20, 2014 (Year: 2014).*

* cited by examiner

*Primary Examiner* — Anca Eoff
*Assistant Examiner* — Kirsten B Tysl
(74) *Attorney, Agent, or Firm* — Sughrue Mion, PLLC

(57) ABSTRACT

Provided is a differential voltage measurement device with enhanced measurement accuracy. A differential amplifying unit outputs a voltage corresponding to a difference voltage between a voltage held by the first capacitor and a voltage held by the second capacitor. The μCOM connects a battery cell to both ends of the first capacitor, and connects the cell battery to both ends of the second after the first capacitor holds the voltage across the cell battery. SW disconnects the electrical connection between the first capacitor and the negative electrode of and the negative electrode of the cell battery. μCOM, after the first capacitor holds the voltage across the cell battery, turns off the SW.

11 Claims, 7 Drawing Sheets

DIFFERENTIAL VOLTAGE MEASUREMENT DEVICE

TECHNICAL FIELD

The present invention relates to a differential voltage measurement device.

BACKGROUND ART

For example, in various vehicles such as an electric vehicle (EV) traveling using an electric motor, an electric vehicle 1 such as a hybrid vehicle (HEV) that travels with the combined use of the electric motor, secondary batteries such as lithium ion rechargeable batteries and nickel hydride rechargeable batteries are installed as a power source.

Such a secondary battery is deteriorated by repeating charging and discharging, and the storage capacity (current capacity, electric power capacity, etc.) gradually decreases in response to the increase in the voltage. Then, in the electric vehicle etc. using rechargeable batteries, detection of the degree of deterioration of the secondary battery obtains storage capacity, calculating the travelable distance with the secondary battery, the lifetime of the secondary battery, and the like.

As one indicator of the degree of deterioration of the secondary battery, there is SOH (State of Health) which is the ratio of current chargeable capacity with respect to the initial storable capacity. It is known that this SOH is associated with the internal resistance of the secondary battery. Therefore, detection of the internal resistance of the secondary battery can obtain the SOH based on this internal resistance.

Generally, since the internal resistance is very small, it was difficult to obtain sufficient detection accuracy, but Patent Document 1 discloses a battery state detection device in which the detection accuracy of the internal resistance is enhanced.

FIG. 9 is a diagram showing a schematic configuration of a battery state detection device 500 described in Patent Document 1. The secondary battery B to be detected has an electromotive force portion e generating a voltage and an internal resistance r. Detection of this internal resistance r can obtain the SOH of the secondary battery B.

The secondary battery B generates a voltage V between both electrodes (positive electrode Bp and negative electrode Bn), this voltage V is determined by the voltage Ve generated by the electromotive force generated by the electromotive force portion e and Vr generated by current flowing through the internal resistance r (V=Ve+Vr). The negative electrode Bn of the secondary battery B is connected to the reference potential G.

The battery state detection device 500 includes a differential amplification unit 511, a changeover switch 512, a first capacitor 513, a second capacitor 514, a charging unit 515, a first analog-digital convertor (ADC) 521, a second analog-to-digital converter (ADC) 522, and a microcomputer (μCOM) 540.

In the configuration shown in this figure, when the μCOM 540 transmits a charge start control signal via the output port PO2, the charging unit 515 starts to flow a predetermined constant current through the secondary battery B. As a result, charging of the secondary battery B is started.

When charging is started, the μCOM 540 controls the changeover switch 512 via the output port PO1 so that the positive electrode Bp of the secondary battery B and the first capacitor 513 are connected. As a result, the first capacitor 513 holds the voltage V1=Ve+R·Ic between both electrodes of the secondary battery B during charging.

Next, the μCOM 540, when the voltage between both electrodes of the secondary battery B acquired through the input port PI1 reaches the predetermined state detection voltage, controls the changeover switch 512 so that the positive electrode Bp of the secondary battery B and the second capacitor 514 are connected and transmits a charge stop control signal to the charging unit 515 through the output port PO2.

As a result, the charging current Ic to the secondary battery B is stopped and the storage state of the second capacitor 514 is stabilized, the second capacitor 514 holds the voltage V 2=Ve between the two electrodes of the secondary battery B during stop of charging.

In this state, the μCOM 540 detects the amplified voltage Vm the differential amplifier 511 outputs through the input port PI2. Then, the detected amplified voltage Vm is divided by the amplifying rate Av of the differential amplifier 511, and further divided by the charging current Ic, the internal resistance r (=(Vm/Av)/Ic) is detected.

Finally, the μCOM 540 sends a charging start signal to the charging unit 515 through the output port PO2. In accordance with this control signal, the charging unit 515 starts to flow the predetermined constant charging current Ic again through the secondary battery B As a result, charging is started and the battery state detection process ends.

PATENT DOCUMENT

Patent Document 1

Japanese Unexamined Patent Application Publication No. 2014-219311

Disclosure of the Invention

Problems to be Solved by the Invention

It is possible to improve the output accuracy for the internal state resistance r of the secondary battery B and to suppress the deterioration of the detection accuracy of the battery state by the battery state detection device 500 described in the cited reference 1.

However, in the above-described battery state detecting apparatus 500, due to the first capacitor 513, even after the voltage V1 of the secondary battery B is held, the negative electrode of the first capacitor 513 remains connected to the reference voltage G of the secondary battery B. For this reason, a minute leakage current occurs, and a phenomenon in which the accumulated charge is released by the capacitor 513 occurs.

When the charge is released from the first capacitor 513, the held voltage V1 is measured lower than the actual value, causing the measurement accuracy to be lowered.

The present invention has been made in view of the above background, and it is an object of the present invention to provide a differential voltage measurement device improving measurement accuracy.

Means for Solving the Problems

A differential voltage measurement device according to a first aspect of the present invention includes: a first capacitor; a second capacitor; a differential amplification unit for outputting a voltage corresponding to a difference voltage between a voltage held by the first capacitor and a voltage held by the second capacitor; a control unit for connecting a battery to both ends of the first capacitor, and after the first capacitor holds a voltage across the battery, connecting the battery to both ends of the second capacitor; and a first switch for interrupting the electrical connection between the first capacitor and a negative electrode of the battery, and after the first capacitor holds the voltage across the battery, the control unit turns off the first switch while connecting the battery to both ends of the second capacitor.

In the differential voltage measurement device according to a second aspect, the first capacitor has a larger capacity than that of the second capacitor.

In the differential voltage measurement device according to a third aspect, a reference potential of the battery differs from that of the differential amplification unit, and the differential voltage measurement device further includes a second switch connecting negative electrodes of the first capacitor and the second capacitor and the reference potential of the differential amplification unit, and the control unit sequentially connects the battery to both ends of the first capacitor and the second capacitor while the second switch is turned off, and after disconnecting both ends of the first capacitor and the second capacitor from the battery, turns on the second switch, and inputs the voltage held by the first capacitor and the voltage held by the second capacitor to the differential amplifying unit while the negative electrode potential of the first capacitor and the second capacitor are set to the reference potential of the differential amplifying unit.

In a differential voltage measurement device according to a fourth aspect, an isolation switch is used for the switch for connecting both ends of the battery and the first capacitor and the second capacitor.

Advantages of the Invention

As described above, according to the first aspect, the control unit turns off the first switch after the first capacitor holds the voltage between both ends of the battery, and electrically disconnects the first capacitor and the negative electrode of the battery. As a result, it is possible to shut off the generation path of the leakage current, improving measurement accuracy.

According to the second aspect, since the capacity of the first capacitor is larger than that of the second capacitor, voltage drop due to charge escape of the first capacitor can be reduced and measurement accuracy can be improved.

According to the third aspect, the differential voltage between the first capacitor and the second capacitor that hold the voltage of the battery can be measured by the differential amplifying unit that is insulated from the battery.

According to the fourth aspect, it is possible to control the switch simply connecting the battery and both ends of the first capacitor and the second capacitor. In addition, it is possible to ensure high and low voltage insulation and for the differential voltage device to handle high voltage battery pack.

BRIEF DESCRIPTION OF THE DRAWINGS

FIG. 6.

MODE FOR CARRYING OUT THE INVENTION

First Embodiment

Embodiments of the present invention will be described in detail with reference to the drawings. The first embodiment is an example in which a differential voltage measurement device is applied to the battery state detecting device.

The battery state detecting device 100 in which the differential voltage measurement device of the present embodiment is incorporated is, for example, mounted on an electric automobile and is connected between the electrodes of the assembled battery BS of the electric vehicle. Assembled battery BS includes a plurality of cell batteries (batteries) Ce1 to Ce4 connected in series. The state detection device 100 detects an internal resistance of the cell batteries Ce1 to Ce4. Of course, it may be applied to an apparatus, a system, etc. other than an electric vehicle equipped with a secondary battery.

Figure 2:
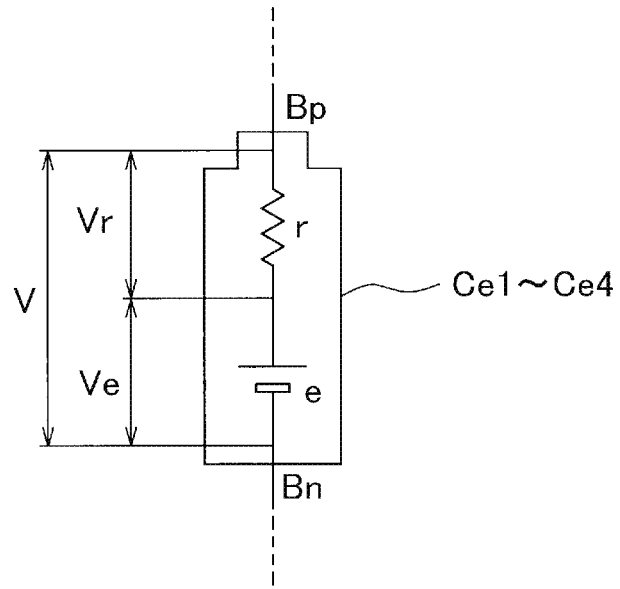
FIG. 2 is a schematic diagram showing an internal configuration of each cell battery shown in FIG. 1.

As shown in FIG. 2, the cell batteries Ce1 to Ce4, which are the detection targets, includes an electromotive force portion e and an internal resistance r. By detecting this internal resistance r, the cell battery Ce1~Ce4 of the cell battery can be obtained.

As shown in FIG. 2, in the cell batteries Ce1 to Ce4 a voltage V is generated between both electrodes (the positive electrode Bp and the negative electrode Bn), and this voltage V is determined by a voltage Ve generated by the electromotive force generated by the electromotive force portion e and a voltage Vr generated by the current flowing through the internal resistor r (V=Ve+Vr). The negative electrode Bn of the cell battery Ce1 is connected to the reference potential G.

Figure 1:
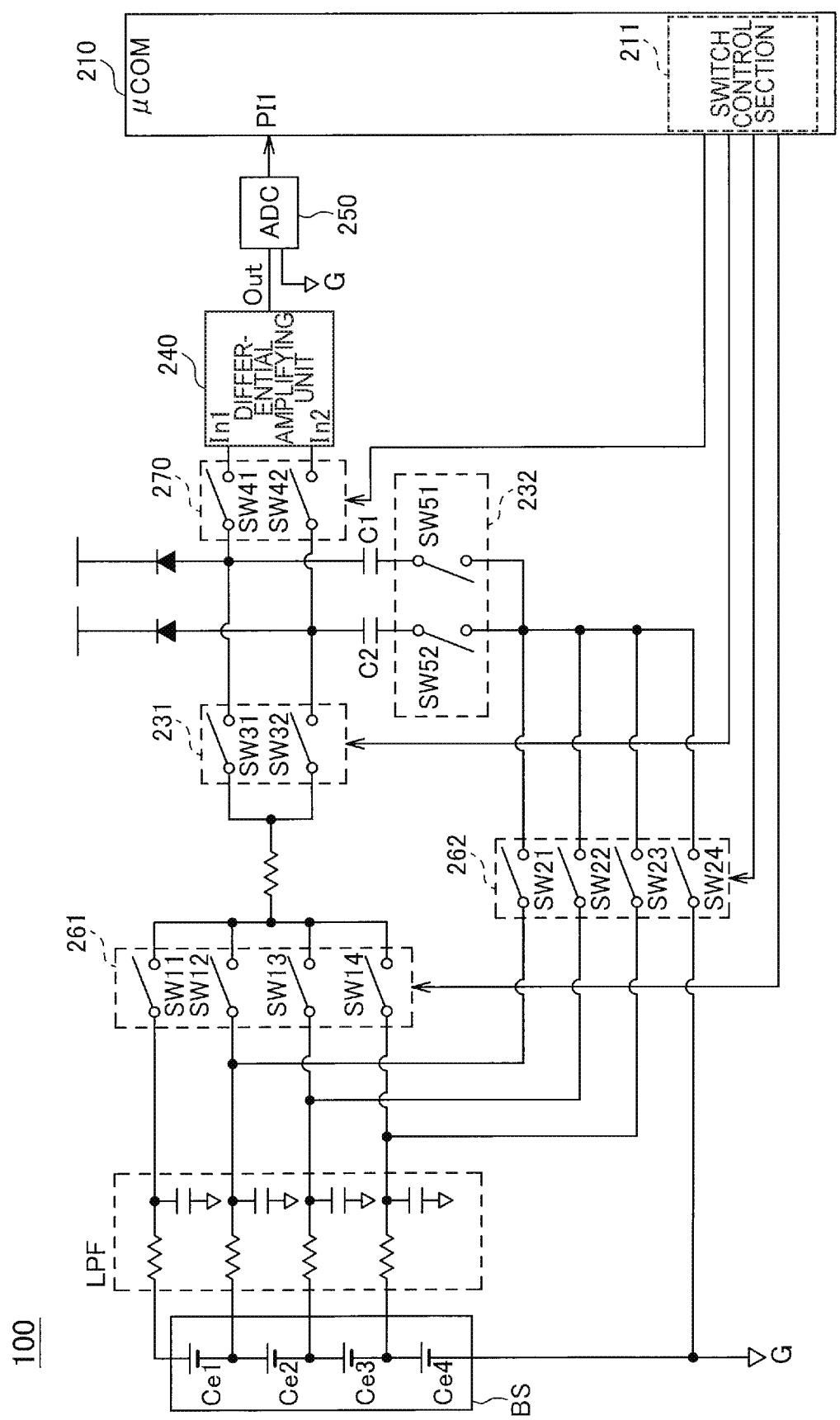
FIG. 1 is a block diagram showing a configuration of a battery state detection device into which a differential voltage measurement device of the present invention according to a first embodiment is installed.

As shown in FIG. 1, the battery state detection device 100 includes a first capacitor C1, a second capacitor C2, μCOM 210, changeover switches 231, 232, a differential amplifying unit 240, an ADC 250, detection object selection switches 261 and 262, and a protection switch 270.

The first capacitor C1 holds as a first voltage both ends voltage of the cell battery Cen (n is an arbitrary integer from 1 to 4) in a first state. The second capacitor C2 holds as a second voltage both end voltage of the cell battery Cen in a second state. Here, the capacity of the first capacitor C1 is set smaller than the capacity of the second capacitor C2.

The changeover switch 231 includes a switch SW31 for switching between a positive electrode Bp of the cell battery Cen and the first capacitor C1 in the first state and a SW32 for switching a positive electrode Bp of the cell battery Cen and the second capacitor C2 in the second state.

The changeover switch 232 includes a SW51 for switching between a negative electrode Bn of the cell battery Cen and the first capacitor C1 in the first state and a SW52 for switching a negative electrode Bn of the cell battery Cen and the second capacitor C2 in the second state.

The detection object selection switch 261 is a switch for connecting one positive electrode Bp selected from the plurality of cell batteries Ce1 to Ce4 to the first capacitor C1 or the second capacitor C2. The detection object selection switch 261 is provided between the positive electrode Bp of each of the cell batteries Ce1 to Ce4 and the changeover switch 231. The detection object selection switch 261 includes a SW11 provided between the positive electrode Bp of the cell battery Ce1 and the changeover switch 231, a SW12 provided between the positive electrode Bp of the cell battery Ce2 and the switch 231, a SW13 provided between the positive electrode Bp of the cell battery Ce3 and the changeover switch 231, and a switch SW14 provided between the positive electrode Bp of the cell battery Ce4 and the changeover switch 231.

The detection object selection switch 262 is a switch for connecting one negative electrode Bn selected from the plurality of cell batteries Ce1 to Ce4 to the first capacitor C1 or the second capacitor C2. The detection object selection switch 262 is provided between the negative electrode Bn of each of the cell batteries Ce1 to Ce4 and the changeover switch 232. The detection object selection switch 262 includes a SW21 provided between the negative electrode Bn of the cell battery Ce1 and the changeover switch 232, a SW22 provided between the negative electrode Bn of the cell battery Ce2 and the switch 232, a SW23 provided between the negative electrode Bn of the cell battery Ce3 and the changeover switch 232, and a switch SW24 provided between the negative electrode Bn of the cell battery Ce4 and the changeover switch SW232.

The protection switch 270 is a switch for protecting the differential amplification unit 240, and reducing a leakage current to the differential amplifier 240 connected to the first capacitor C1 and the capacitor C2. The protection switch 270 is a switch for shutting off a connection between the first capacitor C1 and the second capacitor C2, and the differential amplifier 240 during sample hold with the first capacitor C1 and the second capacitor C2. The protection switch 270 is provided with a SW41 provided between the first capacitor C1 and a first input terminal I1, and a SW 42 provided between the second capacitor C2 and a second input terminal In2. Both SW41 and SW42 turn off during sample hold, and, turns on when the sample hold ends, so as to input a first voltage and a second voltage to the differential amplifying unit 240.

The switch (SW) used in the above-described battery state detection device 100 of the present embodiment, for example, consists of MOSFET.

Figure 3:
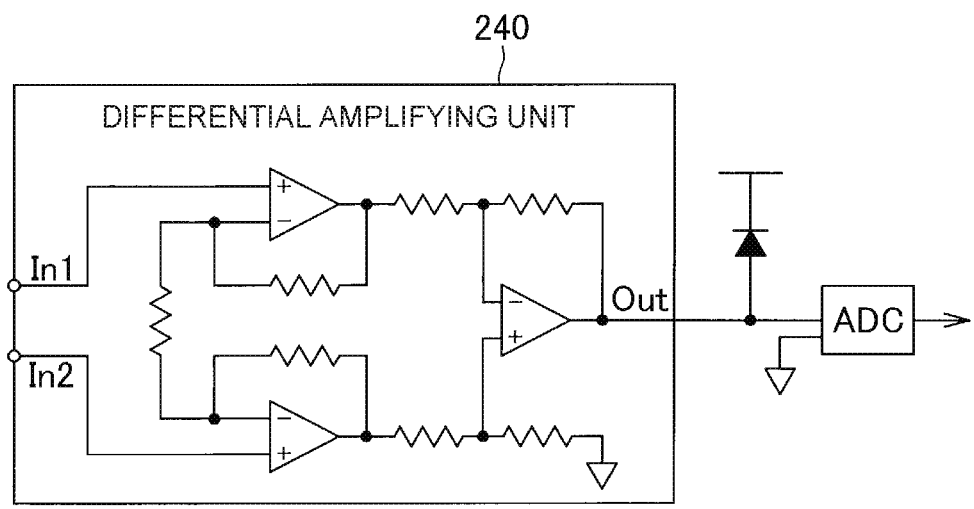
FIG. 3 is a circuit diagram showing details of the differential amplifying unit shown in FIG. 1.

The differential amplifier 240 has two input terminals (a first input terminal In1 and a second input terminal In2) and one output terminal (output terminal Out), and outputs from the output terminal an amplified voltage Vm obtained by amplifying a differential value of a voltage input to these two input terminals with a predetermined amplification factor Av. The differential amplifying unit 240 can be constituted by, for example, an operational amplifier or a circuit shown in FIG. 3.

The ADC 250 converts the analog amplified voltage Vm output from the differential amplifying unit 240 into a digital signal.

The μCOM 210 includes a built-in CPU, ROM, RAM, and the like, and serves as a control unit to control the entire battery state detection device 100. The μCOM 210 is provided with a first input port PI1 into which a signal output from the ADC 250 is input, and a switch control section 211 controlling each switch (SW).

Figure 4:
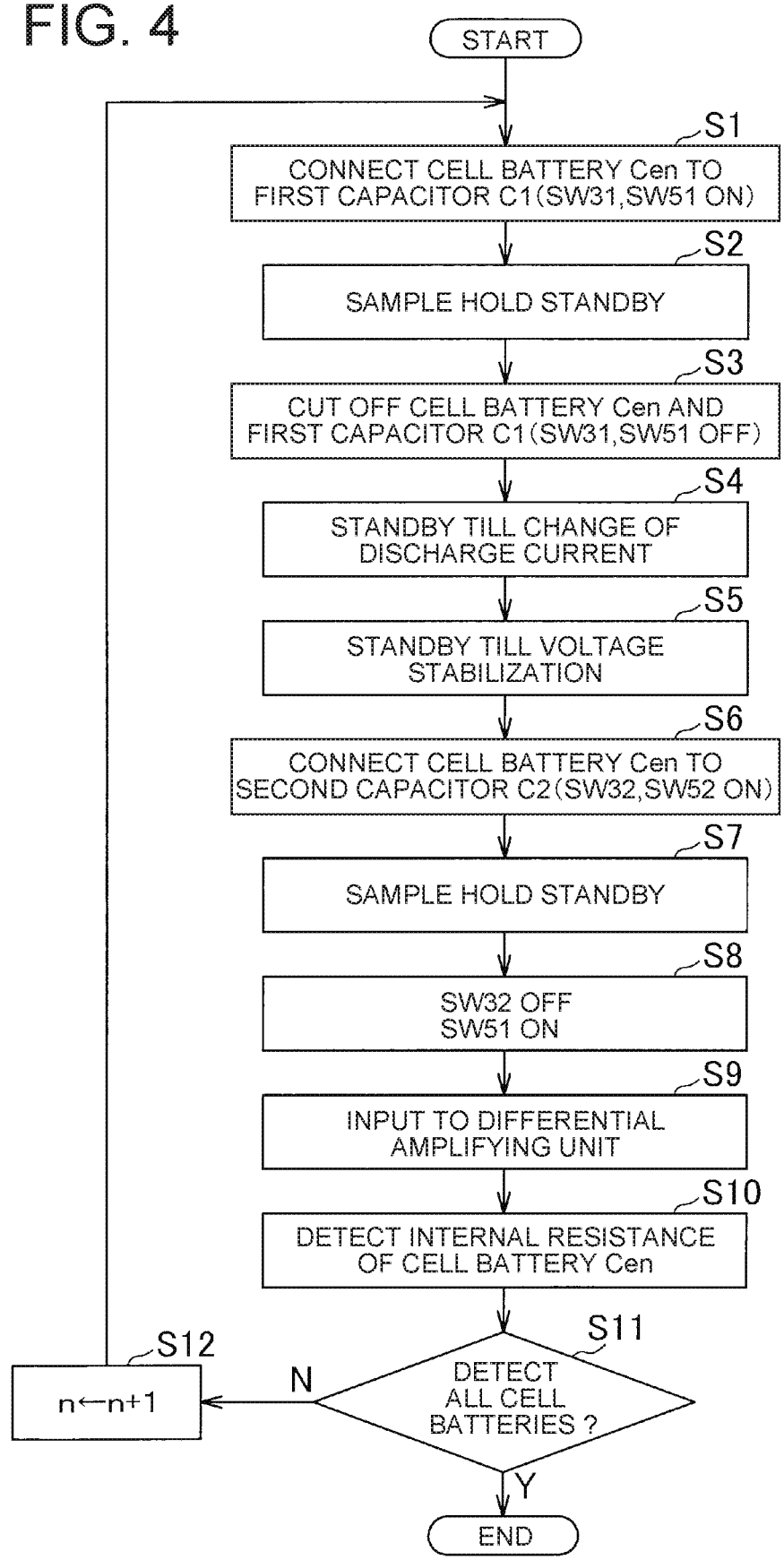
FIG. 4 is a flowchart showing a procedure for detecting a battery state in μCOM shown in FIG. 1.
Figure 5:
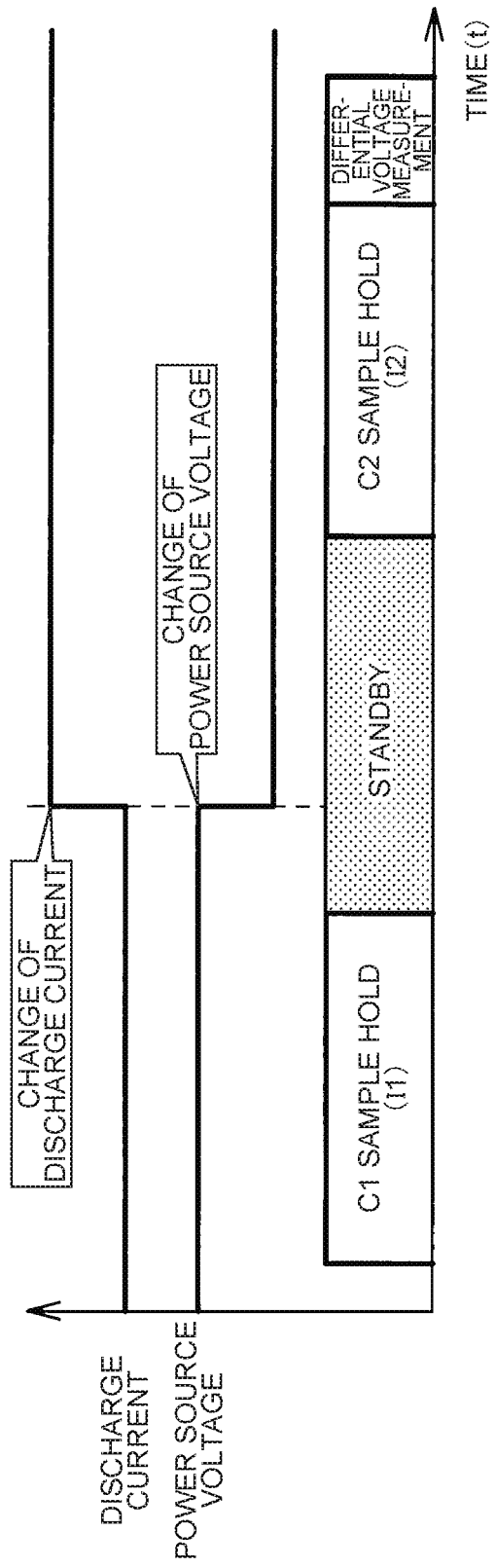
FIG. 5 is a time chart for explaining the operation of the battery state detection device shown in FIG. 1.

Next, with reference to FIGS. 4 and 5, the operation of the battery state detection device 100 having the above-described configuration will be explained below.

In the initial state, all the switches are turned off. The μCOM 210, when a discharge current (a first discharge current I1) flows to the assembled battery BS, controls the detection object selection switches 261 and 262 to select one of the cell batteries Ce1 to Ce4, and controls the changeover switches 231 and 232 to connect both ends of the selected cell battery Cen to the first capacitor C1 (step S1).

In step S1, the μCOM 210 turns on SW1$n$ and SW2$n$, and selects battery cell Cen. Further, the μCOM 210 turns on SW31 and SW51 among the changeover switches 231 and 232 to connect the first capacitor C1 to both ends of the selected cell battery Cen. As a result, charges flow into the first capacitor C1 from the cell battery Cen.

In the μCOM 210, both ends of the first capacitor C1 is equal to the first voltage which is the voltage between both electrodes of the cell battery Cen during being discharged with the first discharge current I1, and waits till holding the first voltage (step S2). Thereafter, the μCOM 210 controls the changeover switches 231, 232 to cut off the connection between the cell battery Cen and the first capacitor C1 (step S3). That is, in step S3, the μCOM 210 switches off the SW31, SW51. As a result, a current path of the leak current from the first capacitor C1 through the negative electrode Bn of the cell battery Cen can be cut off.

Next, the μCOM 210 waits until the discharge current flowing in the battery pack BS changes (S4). When the discharge current flowing through the assembled battery BS changes (second discharge current I2), μCOM 210 waits until the voltage of the assembled battery BS becomes stable due to the change (step S5). Thereafter, the μCOM 210 controls the changeover switches 231 and 232 to connect both ends of the selected cell battery Cen (step S6).

In step S6, the μCOM 210 turns on SW32 and SW52 among the changeover switches 231, 232 to connect the second capacitor C2 to both ends of the selected cell battery Cen. As a result, charges flow into the second capacitor C2 from the cell battery Cen.

In the μCOM 210, both ends of the second capacitor C2 is equal to the second voltage which is the voltage between both electrodes of the battery cell Cen during being discharged with the second discharge current I2, and waits until holding the second voltage (step S7). Thereafter, the μCOM 210 turns off the SW 32, and cuts off the connection between the second capacitor C2 and the positive electrode of the cell battery Cen, as well as turns on the SW 51 to equalize the potential of the negative electrode of the first capacitor C1 to the negative electrode of the cell battery Cen (step S8).

Next, the μCOM 210 turns on SW 41 and SW 42 of the protection switch 270, and inputs the first voltage held in the 1 capacitor C1 and the second voltage held in the second capacitor C2 to the differential amplifier 240 (step S9).

Thereafter, the μCOM 210 takes in the amplified voltage Vm of the differential amplifier 240 from the input port PI1, and detects the internal resistance r of the cell battery Cen from the taken-in amplified voltage Vm and the first and second discharge currents I1, I2 (step S10). The μCOM 210 terminates the processing if the internal resistances r of all the cell batteries Ce1 to Ce4 are detected (Y in step S 11). The μCOM 210 increments n (step S12), and returns to step S1 if the internal resistances r of all the cell batteries Ce1 to Ce4 have been completed (N in step S 11).

According to the first embodiment described above, μCOM 210, after the first capacitor C1 holds the cell battery C, turns off the SW 51, and cuts off the electrical connection of the first capacitor C1 and the negative electrode of the cell battery Cen. Thereby, as shown in FIG. 5, after the sample hold of the capacitor C1 is completed till the sample hold of the second capacitor C 2 is finished, the leakage current flowing from the first capacitor C1 to the negative electrode Bn of the cell battery Cen can be shut off. As a result, It is possible to suppress the voltage drop of the first voltage held by the first capacitor C1, enhancing the measurement accuracy of the differential amplifier 240.

According to the above-described first embodiment, the first capacitor C1 is larger than the second capacitor C2. Increasing the amount of the capacitance of the first capacitor C1 can reduce the voltage drop due to charge escape while the second capacitor C2 storing electric charge, and reducing the capacity of the capacitor C2 can shorten the power storage period of the second capacitor C2. As a result, the differential voltage is detected while the first voltage of the first capacitor C1 does not decrease, improving the measurement accuracy.

According to the above-described first embodiment, SW 51 and SW 52 are provided on the negative electrode side of the first capacitor C1 and the second capacitor C2, respectively, but is not limited to this. The SW 51 may be provided on the negative electrode side of the capacitor C1, and the SW 52 may be omitted.

Further, according to the above-described first embodiment, the capacitance of the first capacitor C1 is set to be smaller than the capacitance of the second capacitor C2, but is not limited to this. The capacity of the first capacitor C1 and the capacity of the second capacitor C2 may be the same.

Second Embodiment

Figure 6:
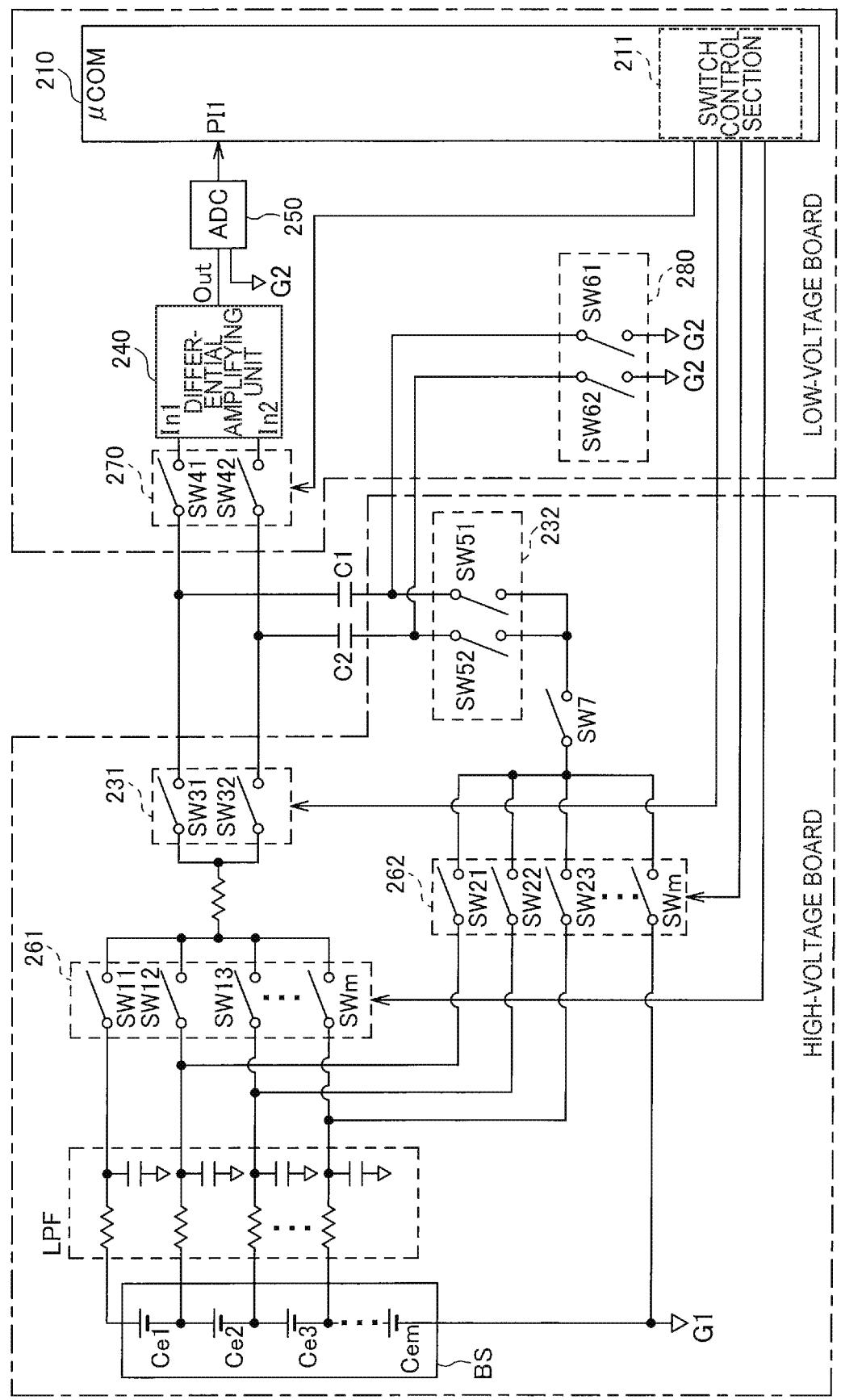
FIG. 6 is a diagram showing a battery state detection in which the differential voltage measurement device of the present invention according to the second embodiment is installed.

Next, a second embodiment of the present invention will be described. FIG. 6 is a diagram showing a schematic configuration of a battery state detection device incorporating a differential voltage difference measurement device of the present invention according to the second embodiment. In the figure the same parts as already explained in FIG. 1 of the first embodiment are attached to the same reference numerals and a detailed description thereof will be omitted.

In the above-described first embodiment, the reference potential G of the assembled battery BS and the reference potential G of the differential amplifier 240, the μCOM 2 and of the ADC 250 were the same. However, in the second embodiment, the reference potential G1 of the assembled battery BS differs from the reference voltage G2 of the differential amplifier 240, the μCOM 210, and the ADC 250, and the differential amplifying unit 240, the μCOM 210, and the ADC 250 are insulated from the assembled battery BS. In the second embodiment, the assembled battery BS is composed of m cell batteries Ce1 to Cem (m is an arbitrary integer number).

As shown in FIG. 6, the battery state detection device 100 includes a first capacitor C1, a second capacitor C2, a μCOM 210, changeover switches 231, 232, a differential amplifier 240, ADC 250, detection object selection switches 261 and 262, a protection switch 270, a ground selection switch 280, and a SW 7.

Regarding the first capacitor C1, the second capacitor C2 and the μCOM 210, since they are equivalent to the first embodiment, a detailed description thereof will be omitted. The SW 31, SW 32, SW 51, and SW 52 of the changeover switches 231, 232 are composed of MOSFETs in the first embodiment, however, in the second embodiment, a photo MOS is used in the second embodiment.

Since the differential amplifier 240, the ADC 250, the detection object selection switches 261 and 262, and the switch 270 are similar to the first embodiment described above, a detailed description thereof will be omitted. The ground changeover switch 280 includes a SW61 (a second switch) that connects the negative electrode of the first capacitor C1 and the reference potential G2, a SW 62 (second switch) that connects a negative electrode of the second capacitor C2 and the reference potential G2. It is to be noted that SW 61 is connected between SW 51 and the negative electrode of the capacitor C1. SW 62 connects the SW 52 and the negative electrode of the second capacitor C2. SW 7 is a switch provided between the detection object selection switch 262 and the changeover switch 232.

The above-described changeover switches 231 and 232, the detection object selection switches 261 and 262, and the SW 7 are provided on a high voltage board of the same reference potential G1 as the assembled battery BS. On the other hand, the μCOM 210, the differential amplifier 240, the ADC 250, the protection switch 270, and the ground selector switch 280 are provided on a low-voltage board of the reference potential G2 insulated from the assembled battery BS.

Figure 7:
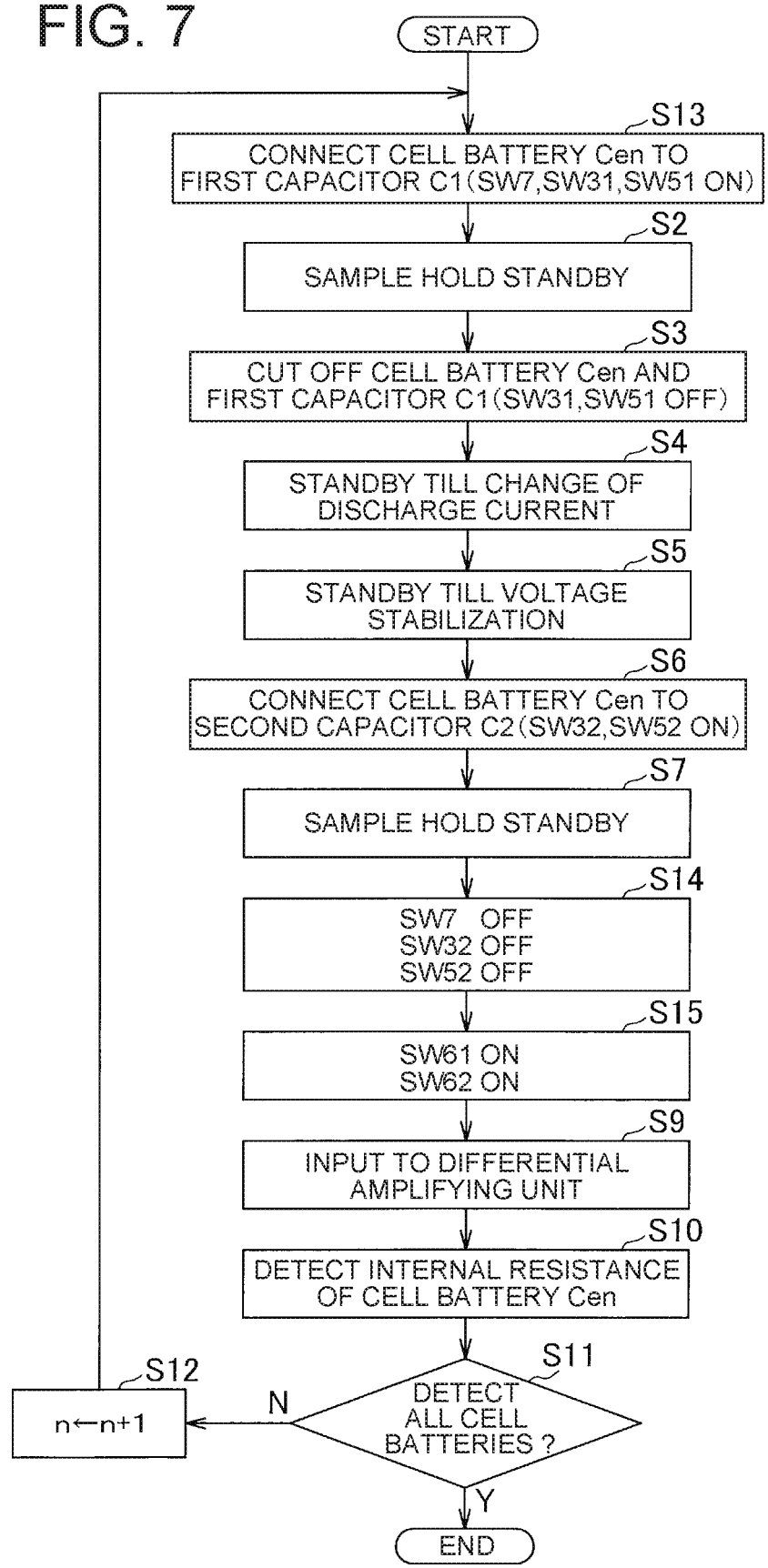
FIG. 7 is a flowchart showing a procedure for detecting a battery state in the μCOM shown in FIG. 6.

Next, the operation of the battery state detection device 100 having the above-described configuration will be described with reference to FIG. 7. In FIG. 7, the same reference numerals are given to the same parts as the steps explained in FIG. 4 and explanation thereof will be omitted.

In the initial state, all the switches are turned off. The μCOM 210, when the discharge current (the first discharge current I1) flows to the assembled battery BS, controls the detection object selection switches 261 and 262 to select one of the cell batteries Ce1 to Cem, and controls the changeover switches 231 and 232 to connect both ends of the selected cell battery Cen (n is an arbitrary integer from 1 to m) to the first capacitor C1 (step S13).

In step S13, the μCOM 210 turns on SW1n and SW2n to select the battery Cen. In addition, the μCOM 210 turns on SW31, SW51 among the changeover switches 231 and 232 and turns on SW7 to connect the first capacitor C1 to both ends of the selected cell battery Cen.

Next, the μCOM 210 operates steps S2 to S7 as in the first embodiment. Next, the μCOM 210 turns off the switches SW 32 and SW 52 and turns off the switch SW 7 (step S14). As a result, both ends of the second capacitor C2 are disconnected from the cell battery Cen. At this time, both ends of the first capacitor C1 are already disconnected from the cell battery Cen.

Next, the μCOM 210 turns on SW 61 and SW 62 (step S 15). Thus, the negative electrode potentials of the first capacitor C1 and the second capacitor C2 can be set to the reference potential G2. Thereafter, the μCOM 210 performs steps S9 to S12 as in the first embodiment.

According to the above-described embodiment, while the μCOM 210 turns off the switches SW61 and SW62, one of the cell batteries Ce1 to Cem is sequentially connected to both ends of the first capacitor C1 and the second capacitor C2. As a result, the negative electrode potentials of the first and second capacitors C1 and C2 become the same potential as the negative electrodes of the cell batteries Ce1 to Cem. Thereafter, after both ends of the first capacitor C1 and the second capacitor C2 are separated from one of the cell batteries Ce1 to Cem, the SW 61, SW62 are turned on to input the first voltage held by the first capacitor C1 and the second voltage held by the second capacitor C2 to the differential amplifier 240 in a state that the negative electrode potentials of the first capacitor C1 and the second capacitor C2 are set to the reference potential G2. As a result, the voltage difference between the first capacitor C1 and the second capacitor C 2 holding the voltage of the cell Cen of the cell battery can be measured by the differential amplifying unit 240 which is insulated from battery cell Cen.

Further, when sample-holding, the positive potential of the first capacitor C1 and the second capacitor C2 is, even the highest, the same as the potential of the cell battery Ce1, and negative potential of the first capacitor C1 and the second capacitor C2 becomes the potential of the cell battery Ce2 thereunder. When MOSFETs are used as W 31, SW 32, SW 51 and SW 52, the cell battery Ce1 becomes high and the voltage range of the assembled battery BS to be controlled becomes wider, it will be impossible to control by one switch. According to the above-described embodiment, the photo MOS (insulated switch) is used as SW 31, SW 32, SW 51 and SW52 for connecting both ends of the cell batteries Ce1 to Cem and the first capacitor C1 and the second capacitor C2. Therefore, regardless of the potential of the cell batteries Ce1 to Cem, SW 31, SW 32, SW 51, SW 52 can be easily controlled, in addition, insulation with high and low voltage can be ensured, and the differential voltage measurement device can cope with high voltage battery pack.

In the second embodiment, as the SW 31, the SW 32, the SW 51, and the SW 52, the photo MOS was used, but it is not limited to this. SW31, SW32, SW51, and SW52 may be any insulating switch that can insulate the switch itself from the control section of the switch, and a magnetic switch may be used.

Figure 8:
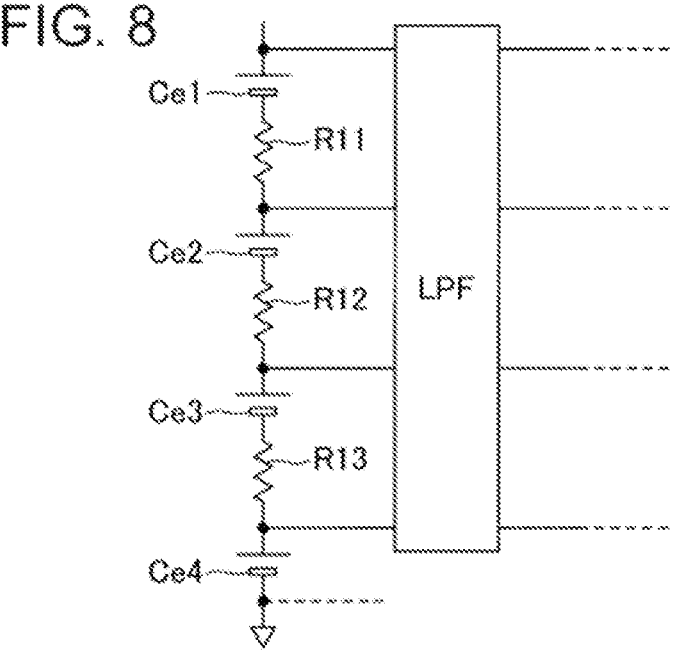
FIG. 8 is a view for explaining the contact/wiring resistance connected between the cell batteries shown in FIG. 1.
Figure 9:
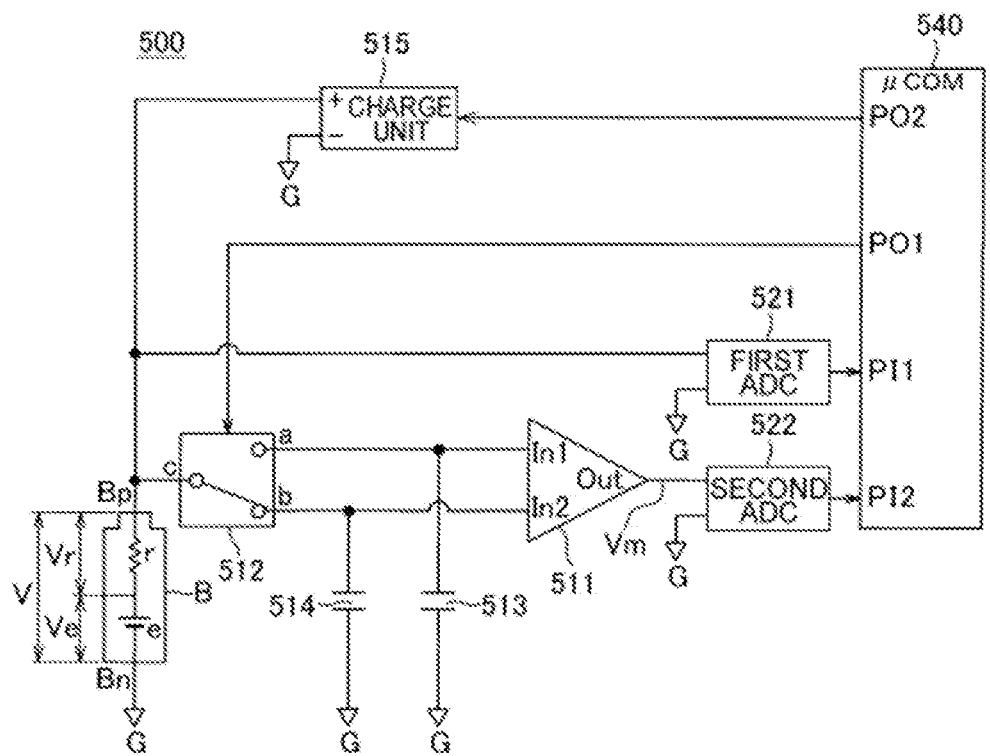
FIG. 9 is a diagram showing a schematic configuration of a conventional battery state detection device.

Incidentally, according to the above-described first embodiment, in the cell batteries Ce1 to Ce4 there occurs contact resistance and wiring resistance with the bus bar for connecting with the respective adjacent cell batteries Ce1 to Ce4. That is, as shown in FIG. 8, contact/wiring resistances R11 to R13 between the cell batteries Ce1 to Ce4 have occurred. Then, the first voltage and the second voltage held by the first capacitor C1 and the second capacitor C2 includes not only the voltage across the cell batteries Ce1 to Ce4, but also the voltage drop caused by the contact/wiring resistors R11 to R13. Therefore, the differential output voltage Vm after output of the differential amplifying unit 511 of the cell battery Cen (n is an arbitrary integer of 1 to 3) includes not only the difference voltage ΔV between the both ends of the cell battery Cen but the difference of the voltage drop occurring at the contact/wiring resistance R1n as shown in the following formula (1).

$$Vm = Av\{\Delta V + R1\ n(I\ 1 - I\ 2)\} \quad (1)$$

Therefore, before the shipment, the contact/wiring resistances R11 to R13 are measured and stored in a not-shown memory, the μCOM 210 may substitute the contact/wiring resistances R 11 to R 13 into equation (3) to obtain the internal resistance rn.

$$rn = \{(Vm/Av) - R\ 1\ n(I\ 1 - I\ 2)\}/(I\ 1 - I\ 2) \quad (2)$$

As a result, it is possible to further improve the detection accuracy of the internal resistance rn.

The first embodiment has been described above, but also in the case of the second embodiment, the cell batteries Ce1 to Ce4 are only changed to the cell batteries Ce1 to Cem, so it can be applied similarly.

It should be noted that the present invention is not limited to the above embodiment. That is, various modifications can be made without deviating from the gist of the present invention.

DESCRIPTIONS OF SYMBOLS

100 Battery state detection device (Differential voltage measurement device)
51 SW (first switch)
61 SW (second switch)
62 SW (second switch)
210 μCOM (control unit)
240 Differential amplifier
C1 First capacitor
C2 Second capacitor
Ce1-Ce4 cell battery (battery)
Ce1-Cem cell batteries (batteries)

The invention claimed is:
1. A differential voltage measurement device comprising:
a first capacitor;
a second capacitor;
a differential amplification unit configured to output a voltage corresponding to a difference voltage between a voltage held by the first capacitor and a voltage held by the second capacitor;
a control unit configured to connect a battery to both ends of the first capacitor, and after the first capacitor holds a voltage across the battery, connecting the battery to both ends of the second capacitor;
a first switch comprising a first switching element and a second switching element, the first switching element being provided in a first electrical path between a negative electrode of the battery and a first electrode of the first capacitor, the first switching element configured to interrupt the electrical connection between the first capacitor and the negative electrode of the battery, the second switching element being provided in a second electrical path between the negative electrode of the battery and a first electrode of the second capacitor, the second switching element being configured to interrupt the electrical connection between the second capacitor and the negative electrode of the battery; and
a second switch comprising a third switching element and a fourth switching element, the third switching element being provided in a third electrical path between a positive electrode of the battery and a second electrode of the first capacitor, the fourth switching element being provided in a fourth electrical path between the positive electrode of the battery and a second electrode of the second capacitor,
wherein the control unit turns on the first switching element and the third switching element so as to connect the battery to the both ends of the first capacitor, and after the first capacitor holds the voltage across the battery, turns off the first switching element and the third switching element, then turns on the second switching element and the fourth switching element so as to connect the battery to the both ends of the second capacitor, and after the second capacitor holds the voltage across the battery, turns off the fourth switching element and turns on the first switching element so as to obtain the output of the differential amplification unit.

2. The differential voltage measurement device according to claim 1, wherein the first capacitor has a larger capacity than the second capacitor.

3. The differential voltage measurement device according to claim 1, wherein a reference potential of the battery differs from that of the differential amplification unit, the differential voltage measurement device further comprising a third switch connecting negative electrodes of the first capacitor and the second capacitor and the reference potential of the differential amplification unit, wherein the control unit sequentially connects the battery to both ends of the first capacitor and the second capacitor while the third switch is turned off, and after disconnecting both ends of the first capacitor and the second capacitor from the battery, turns on the third switch, and inputs the voltage held by the first capacitor and the voltage held by the second capacitor to the differential amplifying unit while the negative electrode potential of the first capacitor and the second capacitor are set to the reference potential of the differential amplifying unit.

4. The differential voltage measurement device according to claim 2, wherein a reference potential of the battery differs from that of the differential amplification unit, the differential voltage measurement device further comprising a third switch connecting negative electrodes of the first capacitor and the second capacitor and the reference potential of the differential amplification unit, wherein the control unit sequentially connects the battery to both ends of the first capacitor and the second capacitor while the third switch is turned off, and after disconnecting both ends of the first capacitor and the second capacitor from the battery, turns on the third switch, and inputs the voltage held by the first capacitor and the voltage held by the second capacitor to the differential amplifying unit while the negative electrode potential of the first capacitor and the second capacitor are set to the reference potential of the differential amplifying unit.

5. The differential voltage measurement device according to claim 1, wherein an isolation switch is used for the first switch for connecting both ends of the battery and the first capacitor and the second capacitor.

6. The differential voltage measurement device according to claim 2, wherein an isolation switch is used for the first switch for connecting both ends of the battery and the first capacitor and the second capacitor.

7. The differential voltage measurement device according to claim 3, wherein an isolation switch is used for the first switch for connecting both ends of the battery and the first capacitor and the second capacitor.

8. The differential voltage measurement device according to claim 4, wherein an isolation switch is used for the first switch for connecting both ends of the battery and the first capacitor and the second capacitor.

9. The differential voltage measurement device according to claim 1, wherein the first switching element is provided directly between the negative electrode of the battery and the first electrode of the first capacitor.

10. The differential voltage measurement device according to claim 3, wherein the third switch is provided directly between the negative electrodes of both the first capacitor and the second capacitor and the reference potential of the differential amplification unit.

11. The differential voltage measurement device according to claim 3, wherein the third switch comprises:
a fifth switching element provided directly between the negative electrode of the first capacitor and the reference potential of the differential amplification unit; and
a sixth switching element provided directly between the negative electrode of the second capacitor and the reference potential of the differential amplification unit.

* * * * *